(12) United States Patent
Muramatsu et al.

(10) Patent No.: US 8,089,840 B2
(45) Date of Patent: Jan. 3, 2012

(54) REPRODUCTION SYSTEM

(75) Inventors: Eiji Muramatsu, Kiyose (JP); Kazuo Kuroda, Yokohama (JP); Takao Sawabe, Tokyo (JP); Toshio Suzuki, Tokyo (JP); Shoji Taniguchi, Tokorozawa (JP); Akira Imamura, Sayama (JP); Masahiro Kato, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 312 days.

(21) Appl. No.: 12/443,562

(22) PCT Filed: Sep. 29, 2006

(86) PCT No.: PCT/JP2006/319522
§ 371 (c)(1),
(2), (4) Date: Mar. 30, 2009

(87) PCT Pub. No.: WO2008/041288
PCT Pub. Date: Oct. 4, 2008

(65) Prior Publication Data
US 2010/0027977 A1  Feb. 4, 2010

(51) Int. Cl.
*H04N 5/00* (2011.01)

(52) U.S. Cl. ............. 369/53.21; 360/15; 360/60

(58) Field of Classification Search ............. 369/53.21, 369/30.07; 386/126; 360/15, 60
See application file for complete search history.

(56) References Cited

U.S. PATENT DOCUMENTS

| 2002/0124093 | A1* | 9/2002 | Nakai | 709/229 |
| 2006/0069827 | A1* | 3/2006 | Kelly | 710/74 |

FOREIGN PATENT DOCUMENTS

| JP | 05-258347 | 10/1993 |
| WO | 95/26028 | 9/1995 |
| WO | 2004/095452 | 11/2004 |

* cited by examiner

*Primary Examiner* — Will J Klimowicz
*Assistant Examiner* — Andrew Sasinowski
(74) *Attorney, Agent, or Firm* — Young & Thompson

(57) ABSTRACT

To limit the time capable of reproducing a plurality of contents as a whole recorded on a recording medium. Provided herein are a recording medium on which a plurality of contents and reproduction-enabled time which is a period of time for allowing a user to freely reproduce the plurality of contents as a whole are recorded, a reproduction device having an acquisition unit which acquires the reproduction-enabled time and a reproduction inhibit unit which inhibits the reproduction of each of the contents when the accumulated reproduction time of the plurality of contents as a whole exceeds the acquired reproduction-enabled time during the reproduction of each of the contents.

12 Claims, 10 Drawing Sheets

F I G. 9
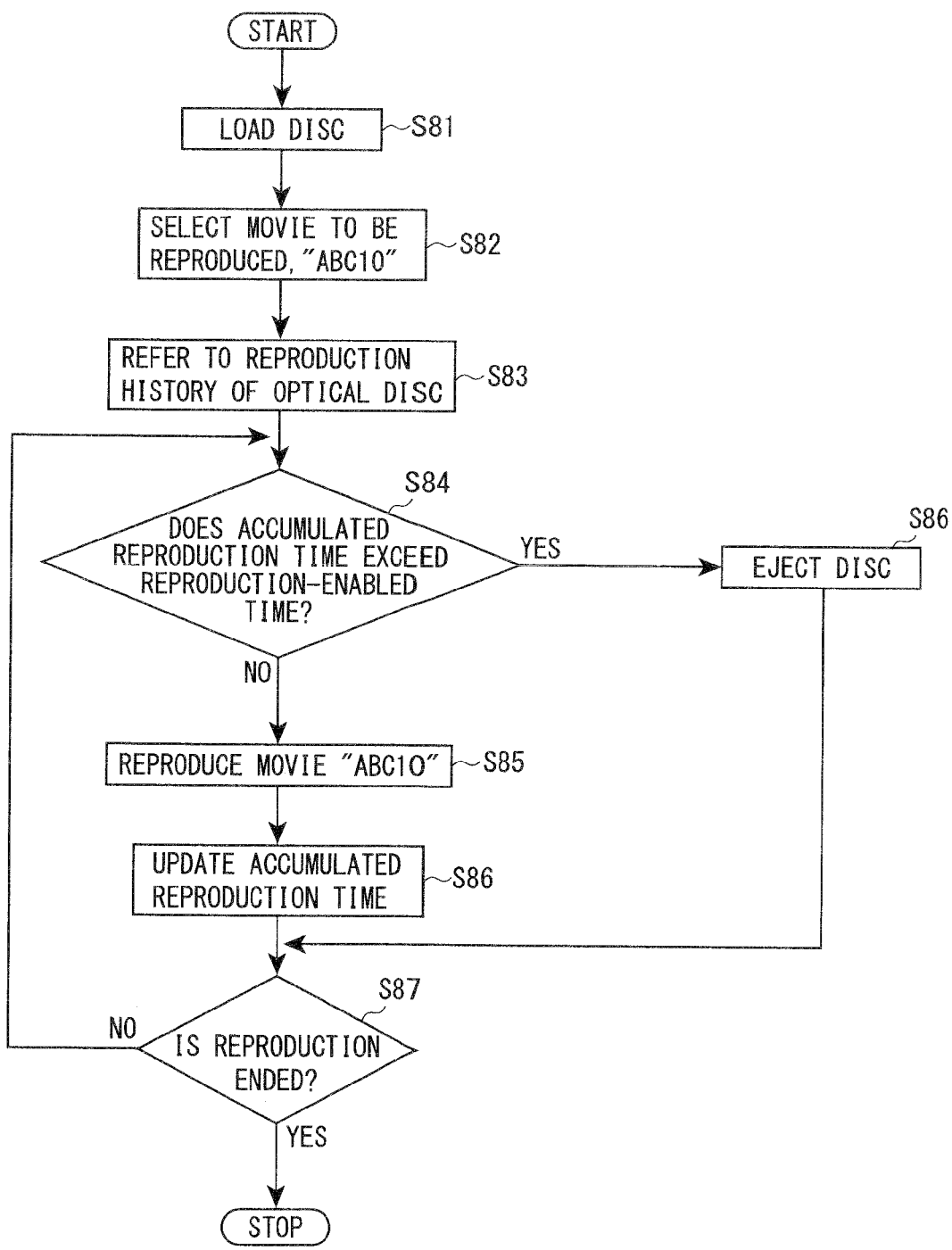

F I G. 1 0
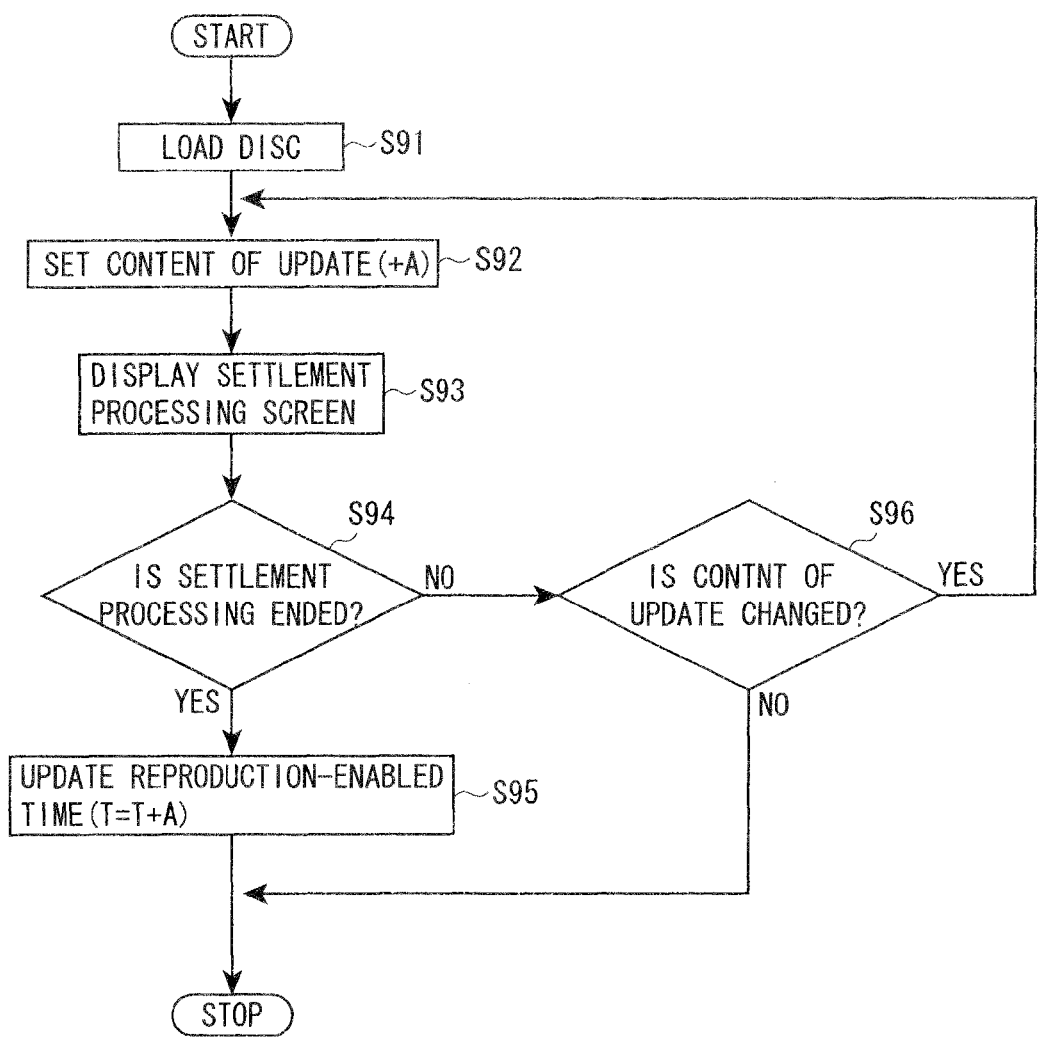

REPRODUCTION SYSTEM

TECHNICAL FIELD

The present invention relates to a reproduction system for reproducing contents, such as images and sounds, recorded on a recording medium.

BACKGROUND ART

In recent years, in this type of reproduction systems, information is encrypted and recorded as typified by a content scramble system (CSS), which is a technology of limiting reproduction of the contents recorded on recording media, such as DVDs (for example, see Patent Document 1).
[Patent Document 1] JP-A-10-69755

DISCLOSURE OF THE INVENTION

Problems to be Solved

Optical discs (recording media) with a large storage capacity (tens of gigabytes (GBs) or more), such as high definition DVDs (HD-DVDs) or Blu-ray discs, have been developed in recent years. Hundreds of movies can be recorded on a single optical disc having a storage capacity of hundreds of GBs. However, a single optical disc becomes very expensive with the price of all the hundreds of movies incorporated. By making the hundreds of movies as a whole available only for several hours, the price can be limited to a charge for the several hours. As a technology to achieve the above, reproduction-enabled time of the plurality of recorded contents as a whole may be limited. Related-art encryption technologies, such as the CSS, can control reproduction of a predetermined content, but cannot limit the reproduction-enabled time of the plurality of contents as a whole.

In view of the above-described problems, an object of the present invention is to provide a reproduction system which can limit the reproduction-enabled time in the plurality of contents as a whole recorded on the recording medium.

Means to Solve the Problems

A reproduction system according to the present invention includes: a recording medium on which a plurality of contents and reproduction-enabled time which is a period of time for allowing a user to freely reproduce the plurality of contents as a whole are recorded, and a reproduction device having an acquisition unit which acquires the reproduction-enabled time and a reproduction inhibit unit which inhibits reproduction of each of the contents when accumulated reproduction time of the plurality of contents as a whole exceeds the acquired reproduction-enabled time during the reproduction of each of the contents.

With this configuration, upon reproduction of a content, when the accumulated reproduction time exceed the reproduction-enabled time, by inhibiting reproduction of the content, the time capable of reproducing the plurality of contents as a whole recorded in the recording medium can be limited within the reproduction-enabled time. Therefore, a user can reproduce the contents within the reproduction-enabled time of the plurality of contents as a whole.

When the accumulated reproduction time exceeds the reproduction-enabled time during the reproduction of each of the contents, the reproduction of the content may be inhibited immediately, or the content may be reproduced to the end and reproduction of the next content may be inhibited.

In this case, it is preferable that the reproduction system further include a history storage unit which stores a reproduction history in which the accumulated reproduction time is recorded, that the reproduction inhibit unit include a reference unit which refers to the reproduction history and a judgment unit which judges whether the accumulated reproduction time exceeds the reproduction-enabled time based on the referred reproduction history, and that the reproduction of each of the contents be inhibited when the accumulated reproduction time is judged to exceed the reproduction-enabled time.

With this configuration, whether the accumulated reproduction time exceeds the reproduction-enabled time is judged by referring to the reproduction history. Based on the determination result, the contents may be reproduced or the reproduction may be inhibited. In this manner, upon reproduction of contents, when the accumulated reproduction time exceed the reproduction-enabled time, the reproduction of the content can be inhibited.

In this case, it is preferable that the recording medium be an optical disc including a content area where the plurality of contents are recorded, and a history storage area which constitutes the history storage unit.

Further, in this case, it is preferable that the recording medium be an optical disc, and that the history storage unit be formed of a rewritable memory in the optical disc.

With this configuration, the reproduction history is stored in the history storage area of the optical disc, or in the rewritable memory in the optical disc. Therefore, since the reproduction history is stored in the optical disc side, and not in the reproduction device side, when a specific recording medium is reproduced alternately with a plurality of reproduction devices, the reproduction history of the recording medium can be recorded appropriately.

In this case, it is preferable that the history storage unit be provided in the reproduction device, and be constituted so that reproduction histories of a plurality of such recording media are stored in association with identification information for identifying each of the recording media, that each of the recording media include the identification information for identifying the recording medium, that the reproduction device further include a recognition unit which recognizes the identification information of the recording medium that has been set, and that the reference unit refer to the reproduction history of the recording medium from the history storage unit based on the recognized identification information of the recording medium.

With this configuration, since the history storage unit is provided in the reproduction device, it is not necessary to provide the rewritable memory in the recording medium and thus, non-rewritable recording media can be used. In the reproduction device, by recognizing the identification information of the set recording medium, the reproduction history of the recording medium can be referred adequately.

In this case, it is preferable that the reproduction-enabled time be recorded in a rewritable manner, that the reproduction system further include an update device which supplies update information of the reproduction-enabled time to the reproduction device based on an instruction by a user, and that the reproduction device further include a rewrite unit which rewrites the reproduction-enabled time based on the supplied update information.

With this configuration, since the reproduction-enabled time can be updated, the reproduction-enabled time can be increased when a user intends to reproduce a content longer than the predetermined reproduction-enabled time. On the contrary, the reproduction-enabled time can also be decreased when the user only requires reproduction hours shorter than the predetermined reproduction-enabled time.

BRIEF DESCRIPTION OF THE DRAWINGS

FIG. 9 is a flow chart showing a series of reproduction control processes in the reproduction system according to the fourth embodiment.

FIG. 10 is a flow chart showing a process of updating a reproduction-enabled time in the reproduction system of the fourth embodiment.

Figure 1:
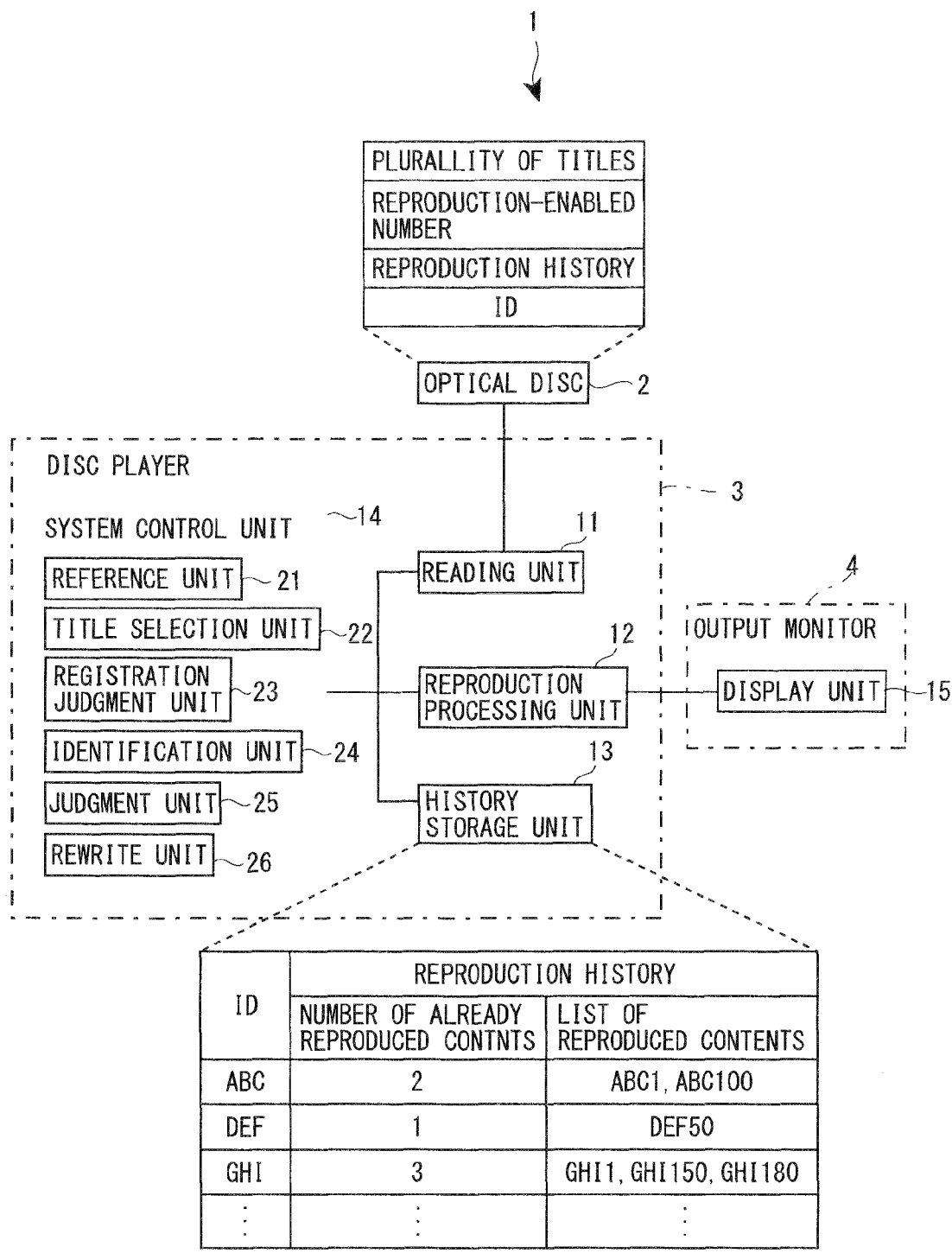
FIG. 1 is a block diagram of a reproduction system according to a first embodiment of the present invention.

REFERENCE NUMERALS 1 reproduction system
2 optical disc
2a history storage area
2b content area
3 disc player
5 update device
11 reading unit
14 system control unit
21 reference unit
24 identification unit
25 judgment unit
26 rewrite unit

BEST MODES FOR CARRYING OUT THE INVENTION

An embodiment of the invention will now be explained with reference to the accompanying drawings. A reproduction system according to this embodiment limits the number of movies that can be reproduced among a plurality of movies (contents) recorded on an optical disc to the predetermined reproduction-enabled number.

FIG. 1 is a block diagram of a reproduction system 1. The reproduction system 1 is formed of an optical disc 2, a disc player 3 (reproduction device), and an output monitor 4 which displays reproduced images. From a functional point of view, the reproduction system 1 is provided with a reading unit 11, a reproduction processing unit 12, a history storage unit 13, and a system control unit 14 which constitute the disc player 3, and a display unit 15 which constitutes the output monitor 4.

The optical disc 2 is a read only memory (ROM) type optical disc with a large capacity (for example, 200 GB), and two hundred movies each being about two hours long are recorded (stored). Further, a reproduction-enabled number which is the number of contents that can be freely reproduced by a user among all the two hundred movies is recorded on the optical disc 2. Here, the reproduction-enabled number N is set to 5. In addition, a plurality of optical discs of different categories (an action, a comedy, an animated cartoon, and other categories), for example, are prepared as the optical disc 2, and each optical disc 2 includes identification (ID) recorded thereon showing identification information of the optical disc 2. For example, an ID of the optical disc 2 containing the action movies is "ABC", an ID of the optical disc 2 containing the comedy movies is "DEF", and an ID of the optical disc 2 containing the animated cartoon movies is "GHI".

The reading unit 11 reads various information, such as the reproduction-enabled number and the ID, in addition to data required for reproduction of each movie, from the optical disc 2. The reading unit 11 is formed of a spindle motor which rotates the optical disc 2, a pickup for reading data, a tracking motor for moving the pickup, and a servo system which controls each motor, for example.

The reproduction processing unit 12 performs data processing, such as demodulation, decryption, and decode of the data read from the optical disc 2. The decoded video signals are output to the display unit 15.

The history storage unit 13 is formed of a rewritable memory (for example, a hard disk), and the reproduction histories of the plurality of optical discs 2 can be stored therein in association with the identification information (ID) of each of the optical discs 2. A list of reproduced contents that registers the movies that had been reproduced among the two hundred movies and the number of reproduced contents corresponding to the total number of the movies that had been reproduced are written in the reproduction history of each of the optical discs 2.

Here, the optical disc 2 (ID="ABC") containing the action movies, the optical disc 2 (ID="DEF") containing the comedy movies, and the optical disc 2 (ID="GHI") containing the animated cartoon movies, for example, are registered in the history storage unit 13 as the optical discs 2 that had been reproduced. In the history storage unit 13, in the optical disc 2 (ID="ABC") containing the action movies for example, a list of reproduced contents in which movies "ABC1" and "ABC100" that had been reproduced are registered, and the number of reproduced contents X(ABC)=2, are stored as a reproduction history thereof.

The system control unit 14 is composed of a central processing unit (CPU), for example, and manages and controls the whole system. The system control unit 14 is formed of a reference unit 21, a title selection unit 22, a registration judgment unit 23, an identification unit 24, a judgment unit 25, and a rewrite unit 26, which are described later.

Figure 2:
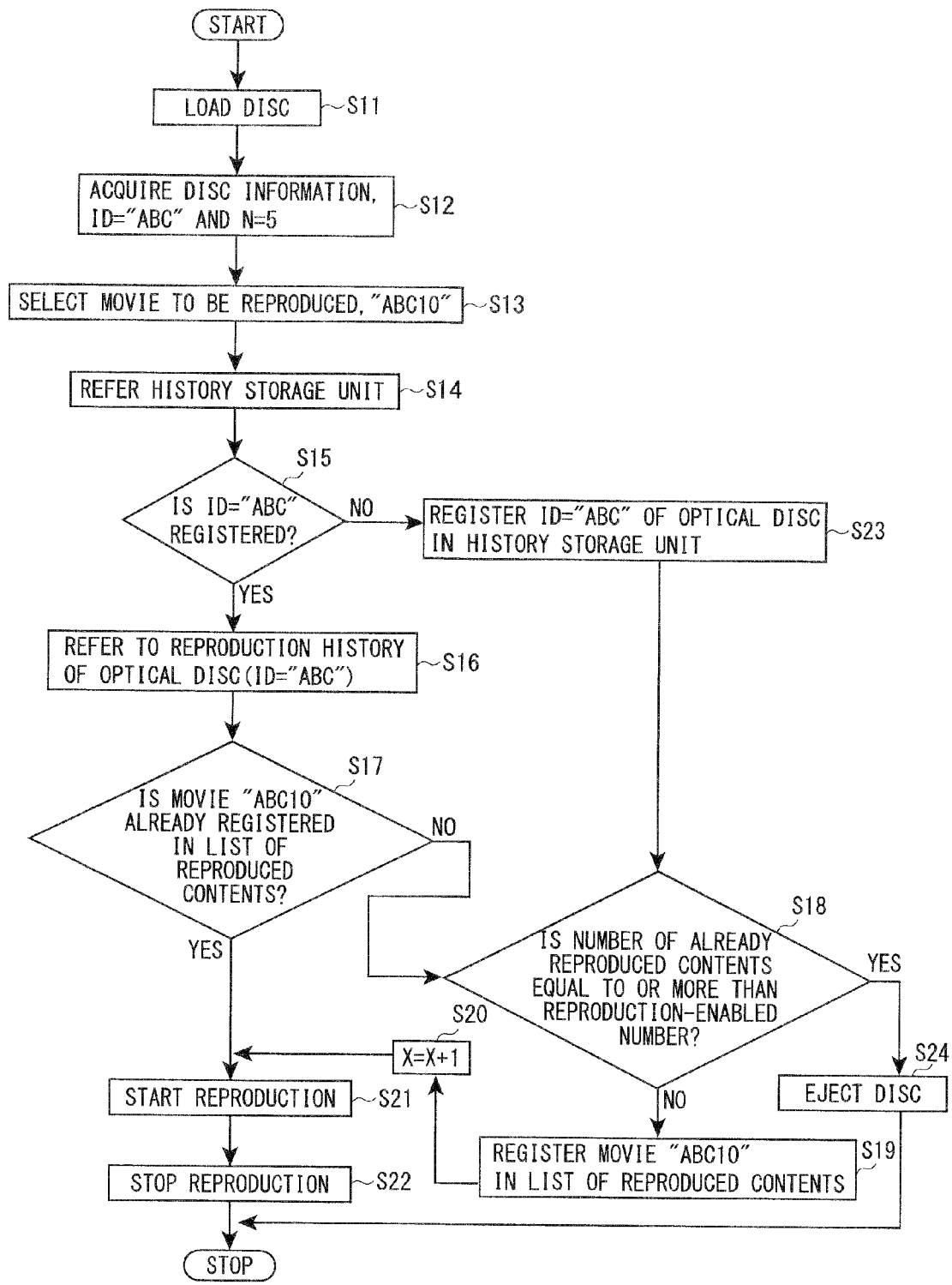
FIG. 2 is a flow chart showing a series of reproduction control processes in the reproduction system according to the first embodiment.

FIG. 2 is a flow chart showing a series of reproduction control processes in the reproduction system 1. First, when the optical disc 2 (ID="ABC") containing the action movies is loaded by a user (S11), for example, the reading unit 11 reads information recorded on the optical disc 2. Accordingly, the reading unit 11 recognizes the ID="ABC", and acquires the reproduction-enabled number N=5 (S12). Successively, the title selection unit 22 displays a title selection screen, and selects a movie to be reproduced based on an instruction by the user on the title selection screen (S13). Here, it is assumed that a movie "ABC10" is selected.

Next, the reference unit 21 refers to the history storage unit 13 (S14). The registration judgment unit 23 judges whether the loaded optical disc 2 (ID="ABC") is registered in the history storage unit 13 (S15). Here, since the ID="ABC" is registered as described above, the registration judgment unit 23 judges that the optical disc 2 (ID="ABC") is registered (Yes in S15).

Successively, the reference unit 21 refers to the reproduction history of the optical disc 2 (ID="ABC") (S16). Then, the identification unit 24 identifies whether the selected movie "ABC10" is registered in the list of reproduced contents based on the referred reproduction history (S17). Here, since only the movies "ABC10" and "ABC100" are registered in the list of reproduced contents as described above, the identification unit 24 identifies that the movie "ABC10" is not registered (No in S17).

Next, the judgment unit 25 judges whether the number of already reproduced contents is equal to or more than the reproduction-enabled number based on the referred reproduction history (S18). Here, since the number of already reproduced contents is X(ABC)=2 and the reproduction-enabled number is N=5, the judgment unit 25 judges that the number of reproduced contents is neither equal to nor more than the reproduction-enabled number (No in S18).

In this case, the rewrite unit 26 newly registers the selected movie "ABC10" in the list of reproduced contents (S19), and further rewrites the number of reproduced contents by incrementing the number (X=X+1) (S20). After that, the reproduction processing unit 12 starts reproduction of the movie "ABC10" (S21). Then, when the reproduction processing unit 12 stops the reproduction (S22), a series of flows are ended.

On the other hand, when the identification unit 24 identifies that the selected movie "ABC10" is already registered in the list of reproduced contents (Yes in S17), the reproduction processing unit 12 starts the reproduction of the movie "ABC10" (S21). In other words, unless the selected movie is a movie that has not been reproduced, since the number of already reproduced contents will not increase when the selected movie is reproduced and the selected movie will be reproduced.

Further, when the registration judgment unit 23 judges whether the loaded optical disc 2 (ID="ABC") is registered in the history storage unit 13 and judges that the optical disc 2 (ID="ABC") is not registered (No in S15), the rewrite unit 26 registers the ID="ABC" of the optical disc 2 in the history storage unit 13 (S23). After that, the judgment unit 25 judges whether the number of reproduced contents is equal to or more than the reproduction-enabled number (S18). In this case, since the number of reproduced contents X is 0, the judgment unit 25 judges that the number of already reproduced contents is neither equal to nor more than the reproduction-enabled number (No in S18), and consequently, the reproduction processing unit 12 reproduces the movie "ABC10" (S21).

Further, when the judgment unit 25 judges that the number of reproduced contents is equal to or more than the reproduction-enabled number (Yes in S18), the system control unit 14 inhibits the reproduction of the movie "ABC10". For example, the optical disc 2 (ID="ABC") is ejected forcibly by driving a disc loading mechanism, which is not shown (S24).

Thus, in the reproduction system 1 according to this embodiment, when the selected movie "ABC10" is registered in the list of reproduced contents (Yes in S17), the movie "ABC10" will be reproduced (S21). Further, when the selected movie "ABC10" is not registered in the list of reproduced contents (No in S17), and if the number of reproduced contents is neither equal to nor more than the reproduction-enabled number (No in S18), the movie "ABC10" will also be reproduced (S21). In this manner, upon reproducing the selected movie "ABC10", if the number of reproduced contents exceeds the reproduction-enabled number N=5, the reproduction of the movie "ABC10" can be inhibited.

Next, a second embodiment of a reproduction system will be explained. The reproduction system in the second embodiment has approximately the same configuration as that of the reproduction system in the first embodiment. However, the reproduction system in the second embodiment is different from that in the first embodiment in that a reproduction history of each optical disc is stored in a history storage area provided in the optical disc in the reproduction system according to the second embodiment, while the reproduction histories of the plurality of optical discs 2 are stored in the history storage unit 13 of the disc player 3 in the reproduction system 1 according to the first embodiment. Further, it is also different in that an update device which updates the reproduction-enabled number based on an instruction by a user, and supplies the update information to the disc player is further provided in the second embodiment. An explanation will be given below mainly on the difference.

Figure 3:
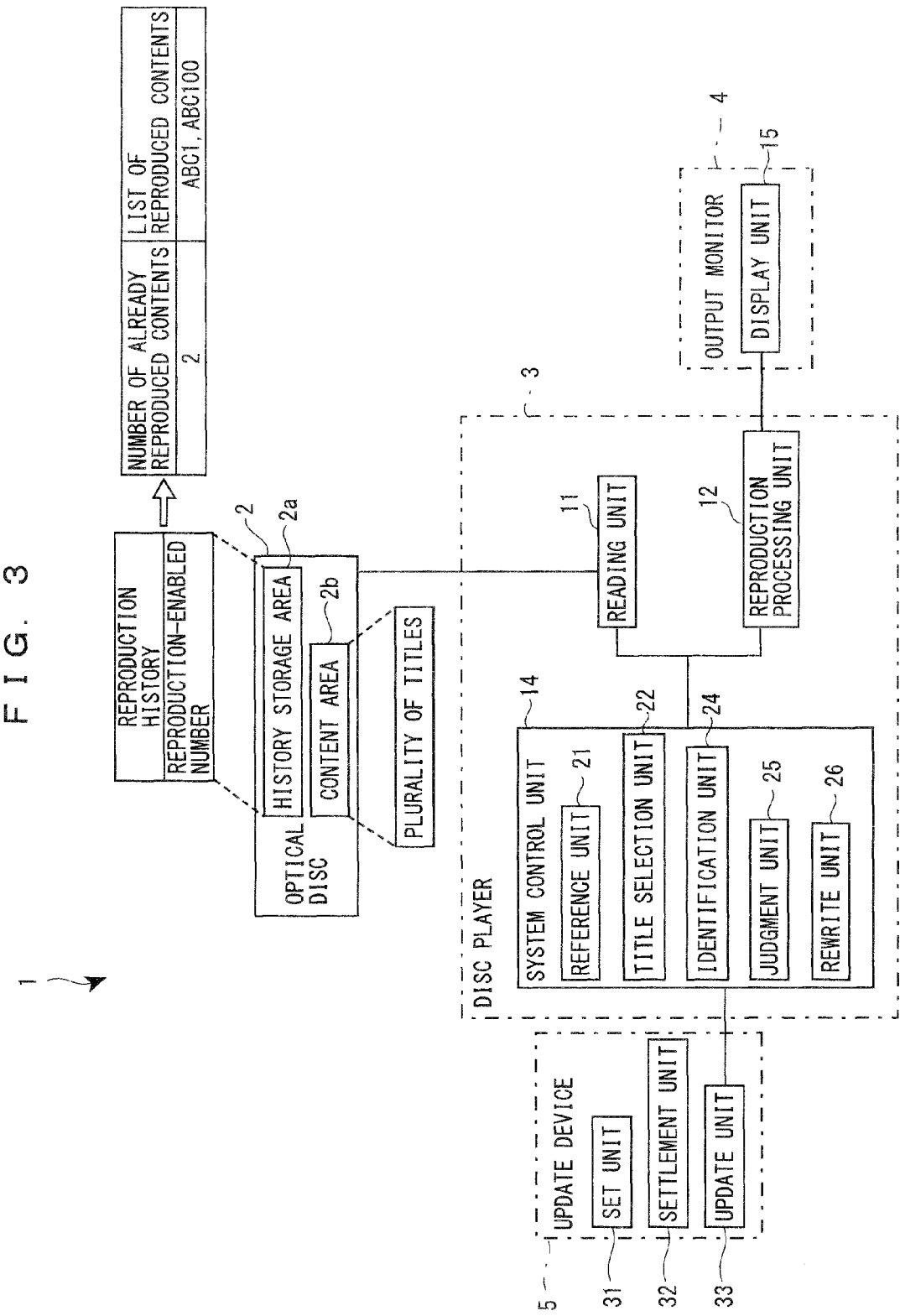
FIG. 3 is a block diagram of a reproduction system according to a second embodiment.

FIG. 3 is a block diagram of a reproduction system 1 in the second embodiment. Although the reproduction system 1 has approximately the same configuration as that in the first embodiment, here, a history storage area 2a is provided in the optical disc 2, and the reproduction system 1 is further provided with an update device 5. The update device 5 is formed of a set unit 31, a settlement unit 32, and an update unit 33.

The optical disc 2 is formed of a content area 2b provided at an outer circumference portion thereof, and the history storage area 2a provided at an inner circumference portion thereof. Two hundred movies are recorded on the content area 2b. The history storage area 2a is rewritable, and the reproduction-enabled number and the reproduction history (the list of reproduced contents and the number of reproduced contents) of the optical disc 2 are stored therein. In other words, in the case of the above-described optical disc 2 containing the action movies, the two hundred movies "ABC1" to "ABC200" are recorded on the content area 2b, and the reproduction-enabled number N=5, the number of reproduced contents X=2, and the list of reproduced contents (the movies "ABC1" and "ABC100") are stored in the history storage area 2a. Note that, the reproduction-enabled number and the reproduction history may be recorded on a magnetic tape stuck on the optical disc 2 or may be recorded on an integrated circuit (IC) chip in the optical disc 2, instead of the history storage area 2a.

The set unit 31 sets a content of the update of the reproduction-enabled number based on the instruction by the user. The settlement unit 32 performs settlement processing with the user based on the content of the update set by the set unit 31. In addition, the update unit 33 updates the reproduction-enabled number based on the content of the update set in response to the settlement processing by the settlement unit 32, and supplies the update information to the system control unit 14 (described later in detail). Further, the rewrite unit 26 of the disc player 3 rewrites the reproduction-enabled number stored in the history storage area 2a based on the supplied update information.

Figure 4:
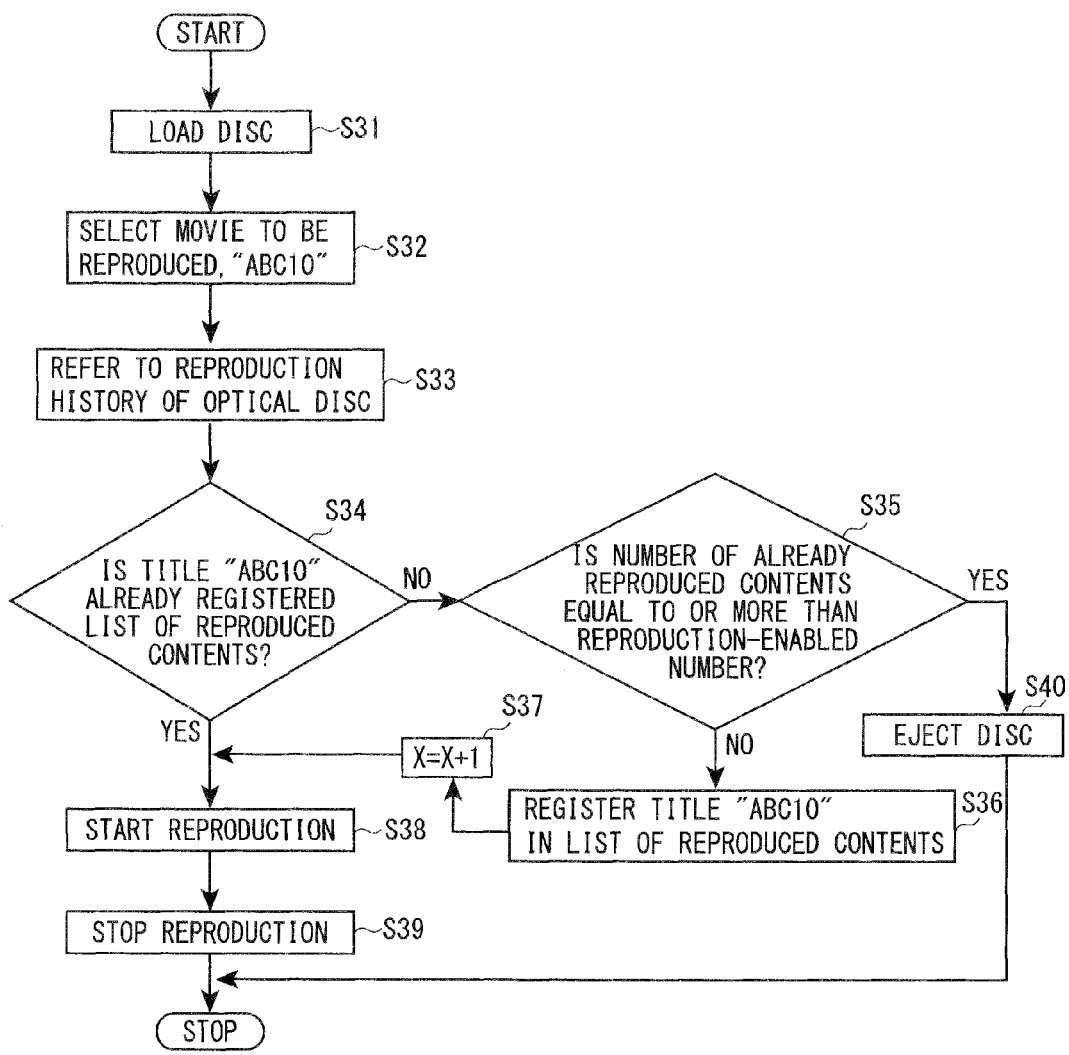
FIG. 4 is a flow chart showing a series of reproduction control processes in the reproduction system according to the second embodiment.

FIG. 4 is a flow chart showing a series of reproduction control processes in the reproduction system 1 according to the second embodiment. First, the optical disc 2 containing the action movies is loaded by a user, for example (S31). Successively, the title selection unit 22 displays the title selection screen, the movie to be reproduced is selected based on the instruction by the user on the title selection screen (S32). Here, it is assumed that the movie "ABC10" is selected.

Successively, the reference unit 21 refers to the reproduction history of the optical disc 2 (S33). Then, the identification unit 24 identifies whether the selected movie "ABC10" is registered in the list of reproduced contents based on the referred reproduction history (S34). Here since only the movies "ABC1" and "ABC100" are registered in the list of reproduced contents as described above, the identification unit 24 identifies that the movie "ABC10" is not registered (No in S34).

Next, the judgment unit 25 judges whether the number of reproduced contents is equal to or more than the reproduction-enabled number based on the referred reproduction history (S35). Here, since the number of reproduced contents X (ABC) is 2 and the reproduction-enabled number N is 5, the judgment unit 25 judges that the number of reproduced contents is neither equal to nor more than the reproduction-enabled number (No in S35).

In this case, the rewrite unit 26 newly registers the selected movie "ABC10" in the list of reproduced contents (S36), and further rewrites the number of reproduced contents by incrementing the number (X=X+1) (S37). After that, the reproduction processing unit 12 starts reproduction of the movie "ABC10" (S38). Then, when the reproduction processing unit 12 stops the reproduction (S39), a series of flows are ended.

On the other hand, when the identification unit 24 identifies that the selected movie "ABC10" is already registered in the list of reproduced contents (Yes in S34), the reproduction processing unit 12 starts the reproduction of the movie "ABC10" (S38).

Further, when the judgment unit 25 judges that the number of reproduced contents is equal to or more than the reproduction-enabled number (Yes in S35), the system control unit 14 inhibits the reproduction of the movie "ABC10" (ejects the optical disc 2) (S40).

Thus, in the reproduction system 1 according to the second embodiment, when the selected movie "ABC10" is registered in the list of reproduced contents (Yes in S34), the movie "ABC10" will be reproduced (S38). Further, when the selected movie "ABC10" is not registered in the list of reproduced contents (No in S34), and the number of reproduced contents is neither equal to nor more than the reproduction-enabled number (No in S35), the movie "ABC10" will also be reproduced (S38). In this manner, upon reproducing the selected movie "ABC10", if the number of already reproduced contents exceeds the reproduction-enabled number N=5, the reproduction of the movie "ABC10" can be inhibited.

In addition, in the reproduction system 1 according to the second embodiment, since the history storage area 2a (rewritable memory) where the reproduction history is stored is provided in the optical disc 2, when specified optical disc 2 is reproduced with the plurality of disc players 3 alternately, the reproduction history of the optical disc 2 can be recorded appropriately. In other words, the reproduction history of each optical disc 2 is stored in the history storage unit 13 provided in the disc player 3 in the reproduction system 1 according to the first embodiment. Therefore, when movies of the reproduction-enabled number have been reproduced with a first disc player 3, using a second disc player 3 allows reproduction of movies including those other than the movies already reproduced with the first disc player 3 again in the reproduction-enabled number (since the number of already reproduced contents is still N=0 in the reproduction history stored in the history storage unit 13 of the second disc player 3). On the other hand, in the reproduction system 1 according to the second embodiment, using the second disc player 3 does not allow reproduction again in the reproduction-enabled number. Therefore, the number of reproduction-enabled movies can be certainly limited among the plurality of movies recorded on the optical disc 2.

Figure 5:
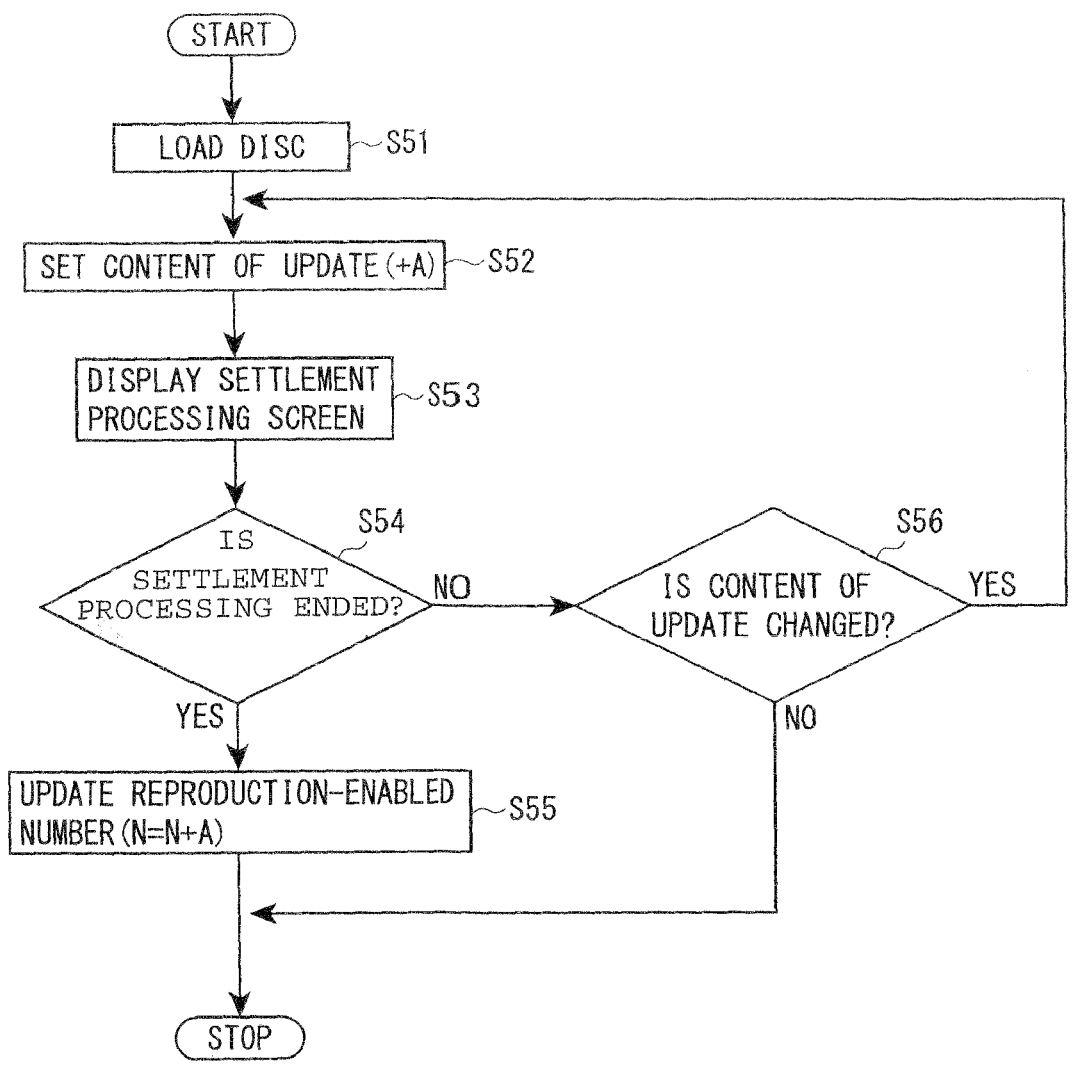
FIG. 5 is a flow chart showing an update process of a reproduction-enabled number in the reproduction system according to the second embodiment.

FIG. 5 is a flow chart showing the process of updating the reproduction-enabled number in the reproduction system 1 according to the second embodiment. First, when the optical disc 2 is loaded (S51), and predetermined operations are made by a user, the set unit 31 displays an update setting screen for setting the content of the update of the reproduction-enabled number on the display unit 15, and the content of the update is set based on the instruction (for example, +3) by the user on the update setting screen (S52).

Then, the settlement unit 32 displays a settlement processing screen for requiring payment of a price (for example, 3 times 100 yen) on the display unit 15 (S53). Here, when the payment is agreed by the user on the settlement processing screen, the settlement unit 32 performs the settlement processing by a credit card transaction via a communication network, for example (Yes in S54). The update unit 33 updates a reproduction limit number (N=5 to N=8) in response to the settlement processing based on the set content of the update (S55). On the other hand, when the payment is rejected by the user on the settlement processing screen, the settlement unit 32 does not perform the settlement processing (No in S54), and the set unit 31 displays a change confirmation screen for the user to decide whether to change the content of the content of the reproduction limit number on the display unit 15. Then, when the updated content is changed based on the instruction by the user on the change confirmation screen (Yes in S56), the set unit 31 displays the update setting screen on the display unit 15 again, and receives the setting of the updated content from the user (S52).

Thus, in the reproduction system 1 according to the second embodiment, since the reproduction-enabled number can be updated, the reproduction-enabled number can be increased when the user likes the movies recorded on the optical disc 2, and intends to reproduce more movies than the original reproduction-enabled number, for example. Note that, while the case where the reproduction-enabled number is increased is explained here, for example, when the user is unsatisfied with the movies recorded on the optical disc 2 and does not intend to reproduce movies as much as the original reproduction-enabled number, the user may update the reproduction-enabled number to be decreased, and may receive a refund.

Next, a third embodiment of a reproduction system will be explained. The reproduction system in the third embodiment has approximately the same configuration as that of the reproduction system in the first embodiment. However, the reproduction system in the third embodiment is different from that in the first embodiment in that reproduction-enabled time in the plurality of movies as a whole will be limited to predetermined reproduction-enabled time in the reproduction system according to the third embodiment, while the number of the reproduction-enabled movies among the plurality of movies recorded on the optical disc 2 is limited to the predetermined reproduction-enabled number in the reproduction system 1 according to the first embodiment. An explanation will be given below mainly on the difference.

Figure 6:
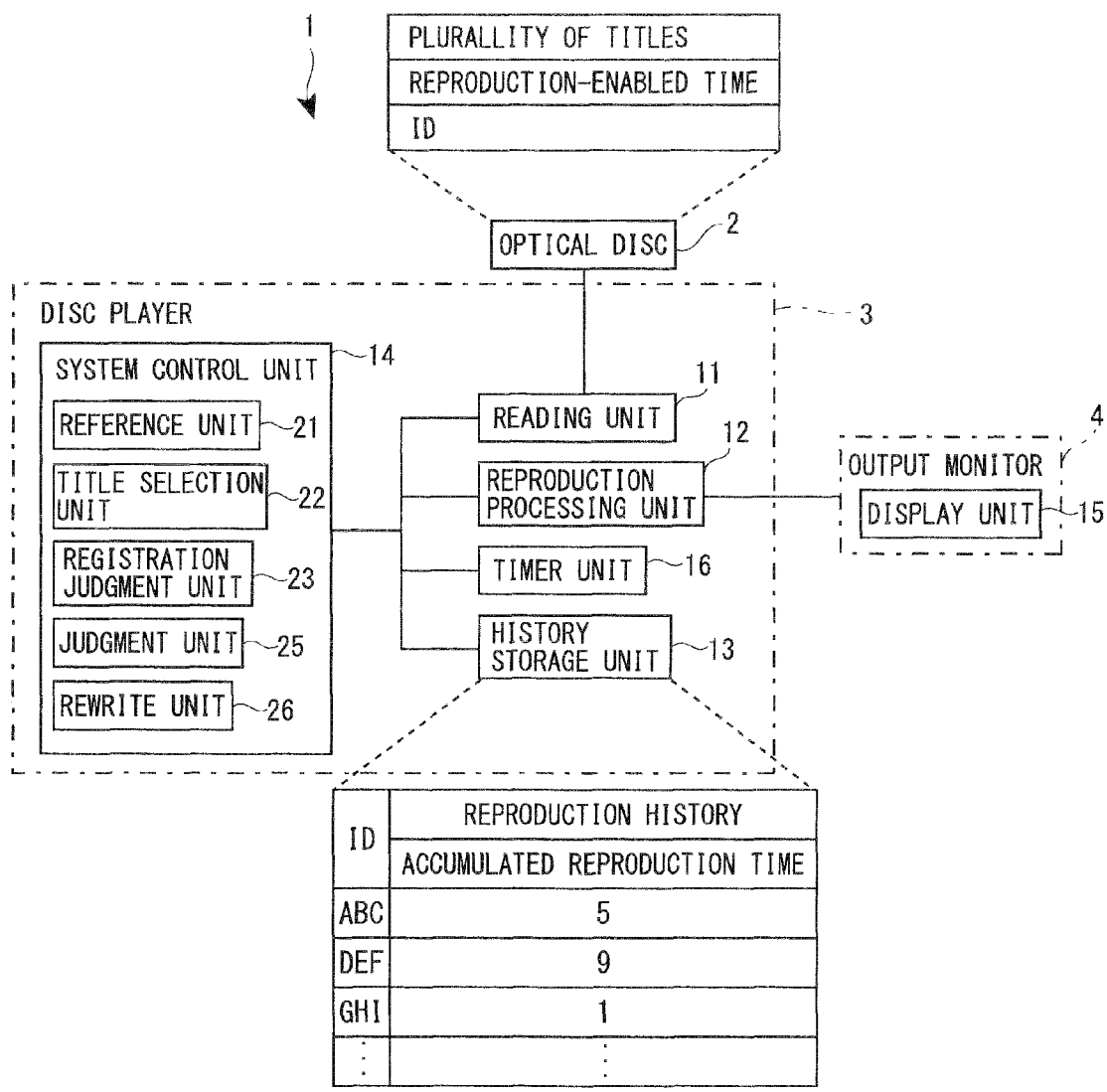
FIG. 6 is a block diagram of a reproduction system according to a third embodiment.

FIG. 6 is a block diagram of a reproduction system 1 in the third embodiment. Although the reproduction system 1 has approximately the same configuration as that in the first embodiment, here, a timer unit 16 which measures the reproduction time is provided in the disc player 3.

While the point that two hundred movies are recorded on the optical disc 2 is the same as that in the first embodiment, unlike the first embodiment, the reproduction-enabled time which is a period of time for allowing a user to freely reproduce the two hundred movies as a whole is recorded thereon, instead of the reproduction-enabled number. Here, the reproduction-enabled time T is set to 10 (hours). As in the first embodiment, a plurality of optical discs are prepared as the optical disc 2, and each optical disc 2 includes ID recorded thereon showing the identification information of the optical disc 2.

As in the first embodiment, the history storage unit 13 can store therein the reproduction histories of the plurality of optical discs 2 in association with the identification information (ID) of each of the optical discs 2. Accumulated reproduction time of the two hundred movies as a whole is described in the reproduction history of each of the optical discs 2.

Here, the optical disc 2 (ID="ABC") containing the action movies, the optical disc 2 (ID="DEF") containing the comedy movies, and the optical disc 2 (ID="GHI") containing the animated cartoon movies, for example, are registered in the history storage unit 13 as the reproduced optical discs 2, as in the first embodiment. In the history storage unit 13, as for the optical disc 2 (ID="ABC") containing the action movies for example, the accumulated reproduction time X(ABC)=5 is recorded as the reproduction history.

Figure 7:
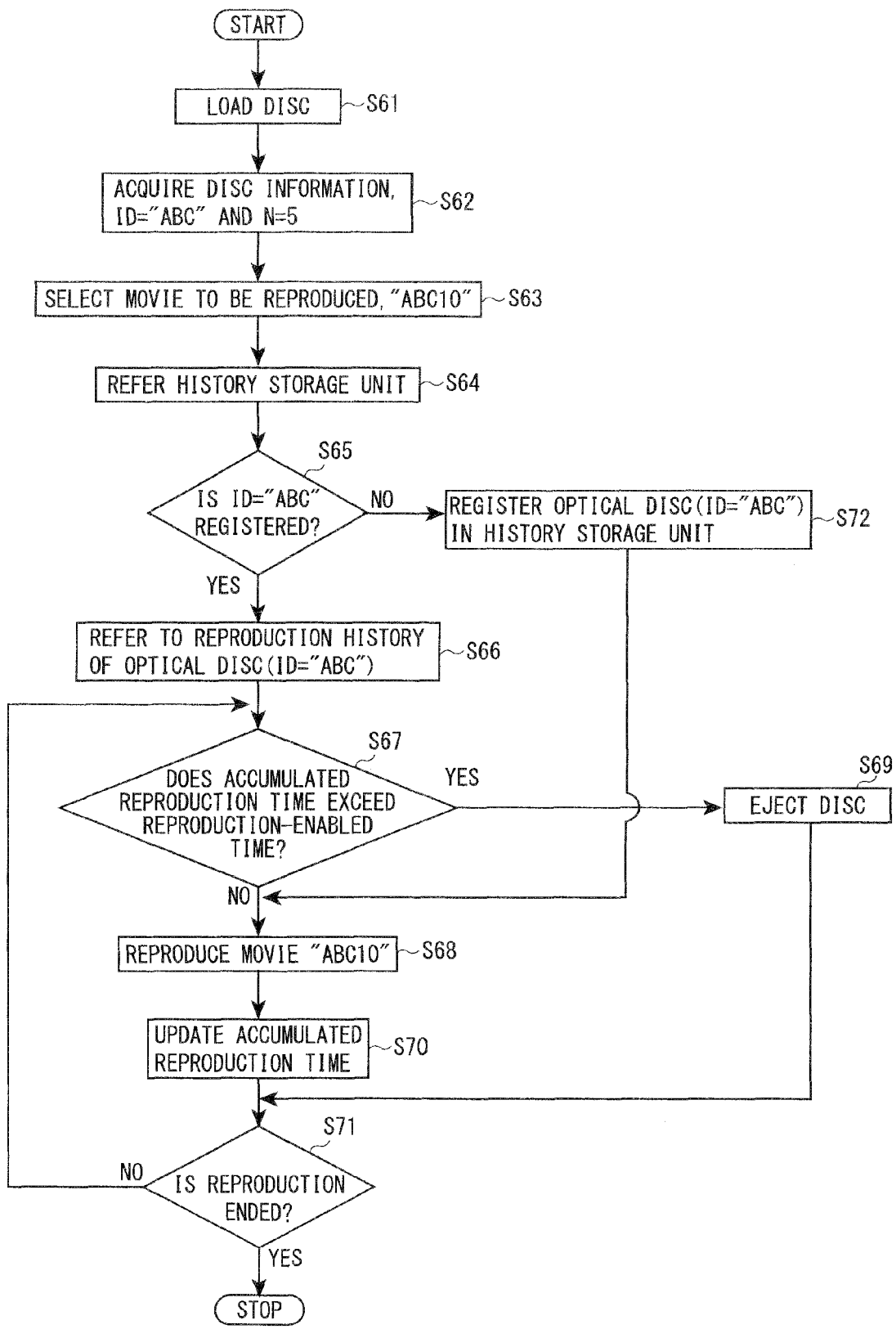
FIG. 7 is a flow chart showing a series of reproduction control processes in the reproduction system according to the third embodiment.

FIG. 7 is a flow chart showing a series of reproduction control processes in the reproduction system 1 according to the third embodiment. First, when the optical disc 2 (ID="ABC") containing the action movies is loaded by a user, for example (S61), the reading unit 11 reads information recorded on the optical disc 2. Accordingly, the reading unit 11 recognizes the ID="ABC", and acquires the reproduction-enabled time T=10 (S62). Successively, the title selection unit 22 displays the title selection screen, and selects a movie to be reproduced based on an instruction by the user on the title selection screen (S63). Here, it is assumed that the movie "ABC10" is selected.

Next, the reference unit 21 refers to the history storage unit 13 (S64). The registration judgment unit 23 judges whether the loaded optical disc 2 (ID="ABC") is registered in the history storage unit 13 (S65). Here, since the ID="ABC" is registered as described above, the registration judgment unit 23 judges that the optical disc 2 (ID="ABC") is registered (Yes in S65).

Successively, the reference unit 21 refers to the reproduction history of the optical disc 2 (ID="ABC") (S66). Then, the judgment unit 25 determines whether the accumulated reproduction time exceeds the reproduction-enabled time based on the referred reproduction history (S67). Here, since the accumulated reproduction time is X(ABC)=5 and reproduction-enabled time is T=10, the judgment unit 25 judges that the accumulated reproduction time does not exceed the reproduction-enabled time (No in S67). Then, the reproduction processing unit 12 reproduces the movie "ABC10" (S68). On the other hand, when the Judgment unit 25 judges that the accumulated reproduction time exceeds the reproduction-enabled time (Yes in S67), the system control unit 14 inhibits the reproduction of the movie "ABC10" (ejects the optical disc 2) (S69).

The movie "ABC10" is reproduced until the accumulated reproduction time exceeds the reproduction-enabled time. In other words, the timer unit 16 starts measuring the reproduction time when the reproduction is started, and the rewrite unit 26 updates the accumulated reproduction time to (X=X+t) based on the measured reproduction time (t) (S70). After the update, when the reproduction processing unit 12 does not end the reproduction (reproduce the movie "ABC10" to the end) (No in S71), the judgment unit 25 judges whether the accumulated reproduction time exceeds the reproduction-enabled time again (S67). When the accumulated reproduction time exceeds the reproduction-enabled time during the reproduction by repeating the above-described steps (Yes in S67), the optical disc 2 is ejected (S69). When the accumulated reproduction time does not exceed the reproduction-enabled time during the reproduction, the reproduction processing unit 12 ends the reproduction (reproduces the movie to the end) (Yes in S71).

The accumulated reproduction time may be updated successively (in real time), or may be updated at every predetermined interval (for example, at an interval set according to the running time of the longest movie among the two hundred movies). For example, when the accumulated reproduction time is X=9 at the start of the reproduction, if the accumulated reproduction time is updated in real time, the optical disc 2 is ejected an hour after the start of the reproduction and the user cannot watch the movie to the end. Meanwhile, when the accumulated reproduction time is updated at an interval set according to the running time of the longest movie in the two hundred movies (for example, every three hours), since the accumulated reproduction time is not updated even an hour after the start of the reproduction, the judgment unit 25 does not judge that the accumulated reproduction time exceeds the reproduction-enabled time. Therefore, the optical disc 2 is not ejected so that the user can watch the selected movie to the end.

On the other hand, when the registration judgment unit 23 judges whether the loaded optical disc 2 (ID="ABC") is registered in the history storage unit 13 and judges that the optical disc 2 (ID="ABC") is not registered. (No in S65), the rewrite unit 26 registers the optical disc 2 (ID="ABC") in the history storage unit 13 (S72). In addition, the accumulated reproduction time is recorded as X=0 in this case. Then, the reproduction processing unit 12 reproduces the movie "ABC10" (S68).

Thus, in the reproduction system 1 according to the third embodiment, when the loaded optical disc 2 (ID="ABC") is not registered in the history storage unit 13 (No in S65), the optical disc 2 is reproduced (S68). Further, even if the loaded optical disc 2 is registered in the history storage unit 13 (Yes in S65), if the accumulated reproduction time does not exceed the reproduction-enabled time (No in S67), the optical disc 2 is reproduced (S68). In this manner, upon reproducing the loaded optical disc 2, if the accumulated reproduction time exceeds the reproduction-enabled time T=10, the reproduction of the optical disc 2 can be inhibited.

Next, a fourth embodiment of a reproduction system will be explained. The reproduction system in the fourth embodiment has approximately the same configuration as that of the reproduction system in the third embodiment. However, the reproduction system in the fourth embodiment is different from that in the third embodiment in that a reproduction history of each optical disc is stored in the history storage area provided in the optical disc in the reproduction system according to the fourth embodiment, while the reproduction histories of the plurality of optical discs 2 are stored in the history storage unit 13 of the disc player 3 in the reproduction system 1 according to the third embodiment. Further, it is also different in that the update device which updates the reproduction-enabled number based on an instruction by a user and supplies the update information to the disc player is further provided in the fourth embodiment. An explanation will be given below mainly on the difference.

Figure 8:
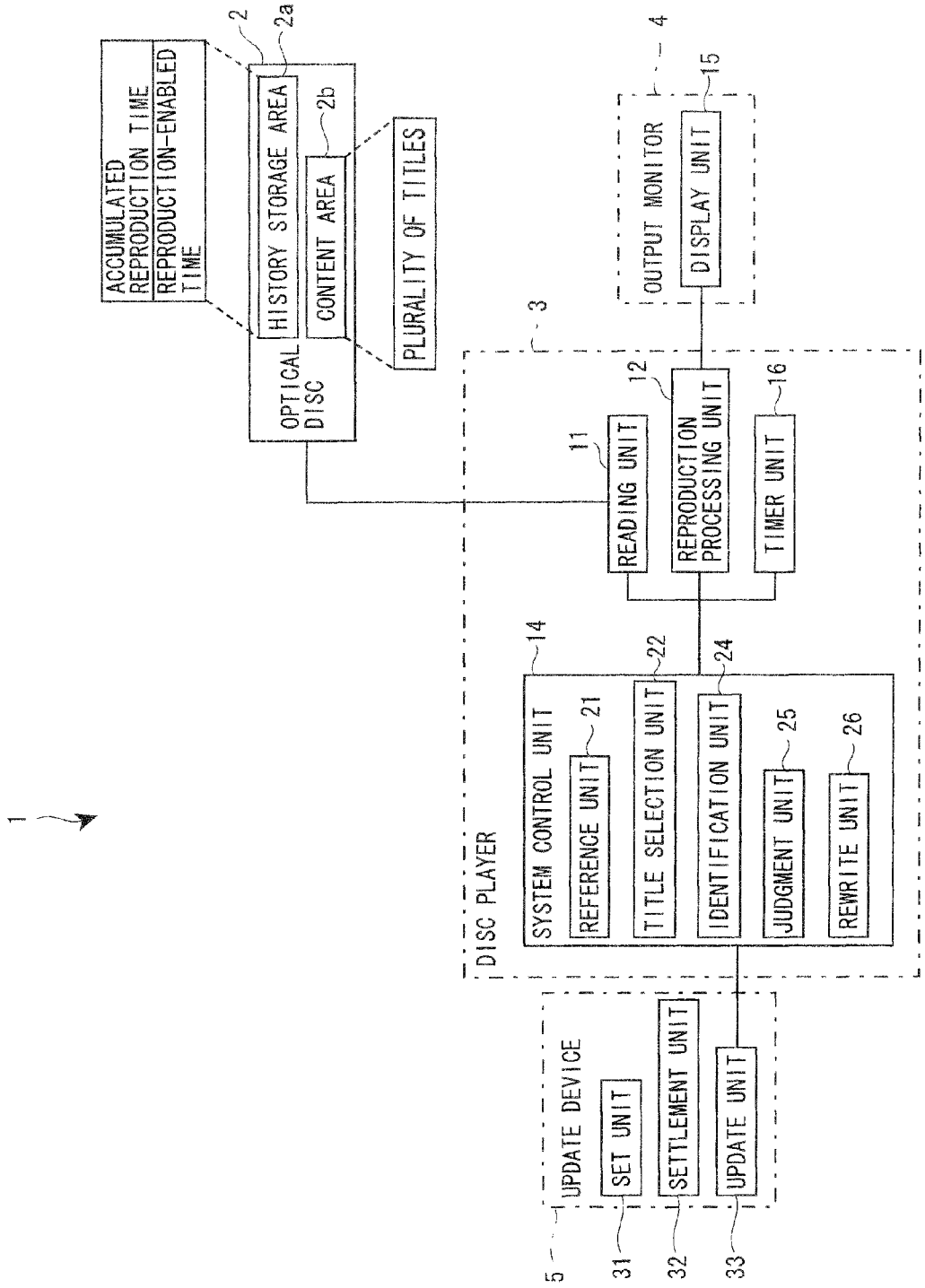
FIG. 8 is a block diagram of a reproduction system according to a fourth embodiment.

FIG. 8 is a block diagram of a reproduction system 1 in the fourth embodiment. Although the reproduction system 1 has approximately the same configuration as that in the second embodiment or the third embodiment, the history storage area 2a is provided in the optical disc 2, and the reproduction system 1 is further provided with the update device 5. The update device 5 is formed of the set unit 31, the settlement unit 32, and the update unit 33.

As in the second embodiment, the optical disc 2 is formed of the content area 2b provided at the outer circumference portion thereof, and the history storage area 2a provided at the inner circumference portion thereof. Two hundred movies are recorded on the content area 2b. The history storage area 2a is rewritable, and the reproduction-enabled time and the reproduction history (the accumulated reproduction time) of the optical disc 2 are stored therein. In other words, in the case of the above-described optical disc 2 containing the action movies, the two hundred movies "ABC1" to "ABC200" are recorded on the content area 2b, and the reproduction-enabled time T=10 and the accumulated reproduction time X=5 are stored in the history storage area 2a. Note that, also in this case, the reproduction-enabled time may be recorded on a magnetic tape stuck on the optical disc 2, or may be recorded on an IC chip in the optical disc 2, instead of the history storage area 2a, as in the second embodiment.

The update device 5 is constituted as with that in the second embodiment. In other words, the set unit 31 sets a content of the update of the reproduction-enabled time based on the instruction by the user. The settlement unit 32 performs settlement processing with the user based on the content of the update set by the set unit 31. In addition, the update unit 33 updates the reproduction-enabled time based on the content of the update set in response to the settlement processing by the settlement unit 32, and supplies the update information to the system control unit 14 (described later in detail). Further, the rewrite unit 26 of the disc player 3 rewrites the reproduction-enabled time stored in the history storage area 2a based on the supplied update information, as in the second embodiment.

FIG. 9 is a flow chart showing a series of reproduction control processes in the reproduction system 1 according to the fourth embodiment. First, the optical disc 2 containing the action movies is loaded by a user, for example (S81). Successively, the title selection unit 22 displays the title selection screen, and selects a movie to be reproduced based on the instruction by the user on the title selection screen (S82). Here, the movie "ABC10" is selected.

Successively, the reference unit 21 refers to the reproduction history of the optical disc 2 (S83). Then, the judgment unit 25 determines whether the accumulated reproduction time exceeds the reproduction-enabled time based on the referred reproduction history (S84). Here, since the accumulated reproduction time is X(ABC)=5 and the reproduction-enabled time is T=10, the judgment unit 25 judges that the accumulated reproduction time does not exceed the reproduction-enabled time (No in S84). Then, the reproduction processing unit 12 reproduces the movie "ABC10" (S85). On the other hand, when the judgment unit 25 judges that the accumulated reproduction time exceeds the reproduction-enabled time (Yes in S85), the system control unit 14 inhibits the reproduction of the movie "ABC10" (ejects the optical disc 2) (S86).

The reproduction of the movie "ABC10" continues until the accumulated reproduction time exceeds the reproduction-enabled time, as in the third embodiment. In other words, the timer unit 16 starts measuring the reproduction time when the reproduction is started, and the rewrite unit 26 updates the accumulated reproduction time based on the measured reproduction time (S88). After the update, when the reproduction processing unit 12 does not end the reproduction (No in S87), the judgment unit 25 judges whether the accumulated reproduction time exceeds the reproduction-enabled time again (S84). When the accumulated reproduction time exceeds the reproduction-enabled time during the reproduction after repeating the above-described steps (Yes in S84), the optical disc 2 is ejected (S86). When the accumulated reproduction time does not exceed the reproduction-enabled time during the reproduction, the reproduction processing unit 12 ends the reproduction (reproduces the movie to the end) (Yes in S87). Note that, the accumulated reproduction time may be updated successively (in real time), or may be updated at predetermined interval (for example, at an interval set according to the running time of the longest movie among the two hundred movies), as in the second embodiment.

Thus, in the reproduction system 1 according to the fourth embodiment, if the accumulated reproduction time does not exceed the reproduction-enabled time (No in S84), the optical disc 2 is reproduced (S87). In this manner, upon reproducing the loaded optical disc 2, when the accumulated reproduction time exceeds the reproduction-enabled time T=10, the reproduction of the optical disc 2 can be inhibited.

FIG. 10 is a flow chart showing an update process of the reproduction-enabled time in the reproduction system 1 according to the fourth embodiment. Since the update process is the same as that in the second embodiment, a brief explanation will be given. First, the optical disc 2 is loaded by a user (S91), and the set unit 31 sets a content of the update of reproduction limit time (for example, +5 hours) (S92).

Then, the settlement unit 32 displays the settlement processing screen on the display unit 15 (S93). Here, when the payment is agreed by the user on the settlement processing screen, the settlement unit 32 performs settlement processing (Yes in S94). The update unit 33 updates the reproduction limit time (T=10 to T=15) in response to the settlement processing (S95). On the other hand, when the payment is rejected by the user on the settlement processing screen, the settlement unit 32 does not perform the settlement processing (No in S94), and the set unit 31 displays the change confirmation screen for the user to decide whether to change the content of the update of the reproduction limit time on the display unit 15. Then, when the updated content is changed based on the instruction by the user on the change confirmation screen (Yes in S96), the set unit 31 displays the update setting screen on the display unit 15 again, and receives the setting of the content of the update from the user (S92). Thus, in the reproduction system 1 according to the fourth embodiment, the reproduction-enabled number can be updated, as in the second embodiment.

As described above, in the reproduction systems according to the first to fourth embodiments, the number of reproduction-enabled movies among the plurality of movies recorded on the optical disc 2 can be limited to the predetermined reproduction-enabled number, or the reproduction-enabled time of the plurality of movies as a whole can be limited to the predetermined reproduction-enabled time.

The reproduction systems 1 can be applied to video rental systems. For example, a customer goes to a rental shop and decides to rent an optical disc 2 of action movies among optical discs 2 each containing two hundred movies of particular categories. In this case, a rental fee will become very expensive if the customer is charged with the rental fee for all the two hundred movies. If reproduction of only five movies or ten hours can be permitted with the reproduction system 1 in the embodiments, the rental fee will be limited to a charge therefor. In other words, since the two hundred movies can be recorded on a single optical disc 2, it is convenient for rental shops because display spaces for the optical discs 2 can be made smaller, and for customers because the optical disc 2 can be rent with a low rental fee.

When applying the reproduction system to such video rental systems as described above, it is convenient for rental shops to limit the reproduction by the reproduction-enabled time, since rental optical discs 2 are more likely to be returned. In other words, when reproduction is limited by the reproduction-enabled number, since the same movie can be reproduced indefinitely, there is a risk that customers may not return the optical disc 2. There is no such risk when reproduction is limited by the reproduction-enabled time, since once the accumulated reproduction time exceeds the reproduction-enabled time, movies cannot be reproduced anymore irrespective of whether the movies have been reproduced or not.

Contents to be reproduced may not be limited to movies and may be each entry of encyclopedias, for example. In other words, actual data of all entries of the encyclopedias is recorded on the optical disc 2, and the entries selected based on an instruction (purchase) by a user are reproduced within the reproduction-enabled number or within the reproduction-enabled time. In this manner, the user should pay a price (subscription) only for the entries to be reproduced. In other words, it is not necessary to purchase the encyclopedias as a whole and the encyclopedias are available in low price.

The invention claimed is:

1. A reproduction system comprising:
   a recording medium on which a plurality of contents, and reproduction-enabled time which is a period of time for allowing a user to freely reproduce the plurality of contents as a whole are recorded; and
   a reproduction device including:
   an acquisition unit which acquires the reproduction-enabled time; a history storage unit which stores a reproduction history on which accumulated reproduction time of the plurality of contents as a whole is recorded in association with identification information for identifying each of the recording media; a recognition unit which recognizes the identification information of the set recording medium; and a reproduction inhibit unit which determines whether the accumulated reproduction time exceeds the acquired reproduction-enabled time by referring to the reproduction history in association with the recognized identification information during the reproduction of each of the contents, and inhibits the reproduction of each of the contents when the accumulated reproduction time exceeds the reproduction-enabled time.

2. The reproduction system according to claim 1, wherein the reproduction-enabled time is recorded in a rewritable manner, the reproduction system further includes an update device which supplies update information of the reproduction-enabled time to the reproduction device based on an instruction by a user, and the reproduction device further includes a rewrite unit which rewrites the reproduction-enabled time based on the supplied update information.

3. The reproduction system of claim 1, wherein, the accumulated reproduction time is updated using a measured reproduction time period of a current content being reproduced.

4. The reproduction system of claim 3, wherein, the accumulated reproduction time in the reproduction history is updated in real time using the measured reproduction time period of the current content being reproduced, and
   when, after the start of the current content being reproduced, the accumulated reproduction time exceeds the acquired reproduction-enabled time, reproduction of the current content is ended without reproducing the current content until an end thereof.

5. The reproduction system of claim 3, wherein, the accumulated reproduction time in the reproduction history is updated, at predetermined time intervals, using the measured reproduction time period of the current content being reproduced, and
   when, after the start of the current content being reproduced, the accumulated reproduction time exceeds the acquired reproduction-enabled time, i) reproduction of the current content continues until an end thereof, and ii) the reproduction inhibit unit inhibits the reproduction of a next content after reproducing the content currently being reproduced until the end thereof.

6. The reproduction system of claim 5, wherein, the predetermined time intervals are greater than a time period corresponding to a running time of a longest content.

7. The reproduction system of claim 3, wherein, the accumulated reproduction time in the reproduction history is updated, at predetermined time intervals, using the measured reproduction time period of the current content being reproduced, and
   when, after the start of the current content being reproduced, the accumulated reproduction time exceeds the acquired reproduction-enabled time, reproduction of the current content is ended without reproducing the current content until an end thereof.

8. The reproduction system of claim 7, wherein, the predetermined time intervals are less than a time period corresponding to a running time of a longest content.

9. A reproduction system comprising:
   a recording medium having recorded thereon i) a plurality of contents, and ii) a reproduction-enabled time which is a period of time for allowing a user to freely reproduce the plurality of contents; and
   a reproduction device including
   i) an acquisition unit which acquires the reproduction-enabled time;
   ii) a history storage unit which stores a reproduction history on which an accumulated reproduction time of the plurality of contents as a whole is recorded in association with identification information for identifying each of the recording media;
   iii) a recognition unit which recognizes the identification information of the set recording medium; and
   iv) a reproduction inhibit unit which determines, during the reproduction of each of the contents, whether the accumulated reproduction time exceeds the acquired reproduction-enabled time by referring to the reproduction history in association with the recognized identification information, and i) when the accumulated reproduction time exceeds the reproduction-enabled time, and ii) after reproducing a content currently being reproduced until an end thereof, inhibits the reproduction of a next content.

10. The reproduction system according to claim 9, wherein the reproduction-enabled time is recorded in a rewritable manner, the reproduction system further includes an update device which supplies update information of the reproduction-enabled time to the reproduction device based on an instruction by a user, and the reproduction device further includes a rewrite unit which rewrites the reproduction-enabled time based on the supplied update information.

11. A reproduction device for use with a recording medium on which a plurality of contents, and reproduction-enabled time which is a period of time for allowing a user to freely reproduce the plurality of contents as a whole are recorded; said device comprising:

an acquisition unit which acquires the reproduction-enabled time;

a history storage unit which stores a reproduction history on which accumulated reproduction time of the plurality of contents as a whole is recorded in association with identification information for identifying each of the recording media;

a recognition unit which recognizes the identification information of the set recording medium; and a reproduction inhibit unit which determines whether the accumulated reproduction time exceeds the acquired reproduction-enabled time by referring to the reproduction history in association with the recognized identification information during the reproduction of each of the contents, and inhibits the reproduction of each of the contents when the accumulated reproduction time exceeds the reproduction-enabled time.

12. The device of claim 11, wherein, the reproduction inhibit unit which determines, during the reproduction of each of the contents, whether the accumulated reproduction time exceeds the acquired reproduction-enabled time by referring to the reproduction history in association with the recognized identification information, and i) when the accumulated reproduction time exceeds the reproduction-enabled time, and ii) after reproducing a content currently being reproduced until an end thereof, inhibits the reproduction of a next content.

* * * * *